United States Patent
Liu et al.

(10) Patent No.: US 9,720,540 B2
(45) Date of Patent: Aug. 1, 2017

(54) TOUCH SIGNAL DETECTION CIRCUIT AND METHOD, AND TOUCH DEVICE

(71) Applicant: Huawei Device Co., LTD., Shenzhen, Guangdong (CN)

(72) Inventors: Hailong Liu, Shenzhen (CN); Jin Zhou, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 117 days.

(21) Appl. No.: 14/575,064

(22) Filed: Dec. 18, 2014

(65) Prior Publication Data

US 2015/0103046 A1 Apr. 16, 2015

Related U.S. Application Data

(63) Continuation of application No. PCT/CN2014/071118, filed on Jan. 22, 2014.

(30) Foreign Application Priority Data

Jan. 22, 2013 (CN) .......................... 2013 1 0022720

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 3/0418* (2013.01)

(58) Field of Classification Search
CPC ...... G06F 1/1681; G06F 3/044; G06F 3/0416; G06F 3/0412; G06F 3/0418; G09G 3/3677
See application file for complete search history.

(56) References Cited

U.S. PATENT DOCUMENTS

| | | | |
|---|---|---|---|
| 2004/0164954 A1* | 8/2004 | Rekimoto | G06F 1/1681 345/156 |
| 2009/0289912 A1 | 11/2009 | Chen et al. | |
| 2010/0051354 A1 | 3/2010 | Ningrat et al. | |
| 2011/0096020 A1 | 4/2011 | Cranfill | |
| 2011/0248955 A1 | 10/2011 | Mo et al. | |
| 2011/0267293 A1 | 11/2011 | Noguchi et al. | |
| 2012/0139868 A1 | 6/2012 | Mamba et al. | |

(Continued)

FOREIGN PATENT DOCUMENTS

| | | |
|---|---|---|
| CN | 101661359 A | 3/2010 |
| CN | 101727242 A | 6/2010 |

(Continued)

*Primary Examiner* — Gerald Johnson
(74) *Attorney, Agent, or Firm* — Leydig, Voit & Mayer, Ltd.

(57) ABSTRACT

The present invention provides a touch signal detection circuit. The touch signal detection circuit includes: a processing unit, at least one linear transmitting electrode, and at least two linear receiving electrodes; the transmitting electrode is perpendicular to the receiving electrode, the receiving electrode is perpendicular to a source driver line of a display screen, and each receiving electrode and each transmitting electrode form one node mutual capacitance; the processing unit acquires capacitance change values of at least two node mutual capacitances, and acquires a location of a touch signal according to the capacitance change values of the at least two node mutual capacitances.

6 Claims, 7 Drawing Sheets

(56) References Cited

U.S. PATENT DOCUMENTS

2012/0249433 A1    10/2012  Deng et al.
2012/0280965 A1 *  11/2012  Lee .................... G09G 3/3677
                                                        345/212
2013/0169583 A1 *   7/2013  Konradi .............. G06F 3/044
                                                        345/174

FOREIGN PATENT DOCUMENTS

| CN | 101840297 A  | 9/2010  |
| CN | 102597938 A  | 7/2012  |
| JP | 2010003285 A | 1/2010  |
| JP | 2011233018 A | 11/2011 |

* cited by examiner

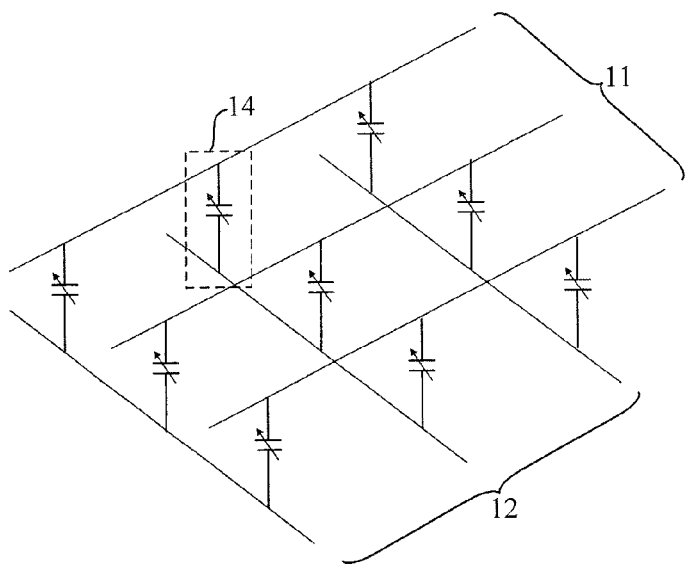

FIG. 2

| Acquire capacitance change values of at least two node mutual capacitances, where the at least two node capacitances are formed by at least two linear receiving electrodes and at least one linear transmitting electrode, the transmitting electrode is perpendicular to the receiving electrode, the receiving electrode is perpendicular to a source driver line of a display screen, and each receiving electrode and each transmitting electrode form one node mutual capacitance | 301 |

| Acquire a location of a touch signal according to the capacitance change values of the at least two node mutual capacitances | 302 |

FIG. 3

|     |     |     |     |     |     |     |     |     |     | Interference value |
|-----|-----|-----|-----|-----|-----|-----|-----|-----|-----|-----|
| 20  | 19  | 21  | 22  | 19  | 20  | 19  | 19  | 21  | 20  | 20  |
| 120 | 119 | 120 | 121 | 119 | 120 | 119 | 120 | 120 | 119 | 120 |
| 50  | 51  | 51  | 52  | 49  | 50  | 49  | 49  | 51  | 50  | 50  |
| 10  | 9   | 11  | 12  | 11  | 10  | 11  | 9   | 12  | 11  | 10  |
| 30  | 29  | 32  | 31  | 33  | 29  | 31  | 31  | 30  | 30  | 30  |
| 20  | 19  | 21  | 22  | 19  | 20  | 19  | 19  | 21  | 20  | 20  |
| 0   | 1   | 1   | 2   | -1  | -1  | 1   | 0   | 0   | 1   | 0   |
| 161 | 159 | 160 | 198 | 268 | 201 | 162 | 161 | 160 | 161 | 160 |
| 10  | 9   | 11  | 152 | 272 | 158 | 12  | 9   | 11  | 10  | 10  |
| 50  | 51  | 51  | 102 | 160 | 105 | 49  | 49  | 51  | 50  | 50  |
| 30  | 29  | 32  | 31  | 33  | 29  | 31  | 31  | 30  | 30  | 30  |
| 20  | 19  | 21  | 22  | 19  | 20  | 19  | 19  | 21  | 20  | 20  |

FIG. 7A

| 0 | -1 | 0 | 2 | -1 | 0 | -1 | -1 | 1 | 0 |
|---|---|---|---|---|---|---|---|---|---|
| 0 | -1 | 0 | 0 | -1 | 0 | -1 | 0 | 0 | -1 |
| 0 | 1 | 1 | 2 | -1 | 0 | -1 | -1 | 1 | 0 |
| 0 | -1 | 1 | 2 | 1 | 0 | 1 | -1 | 2 | 1 |
| 0 | -1 | 2 | 1 | 3 | -1 | 1 | 1 | 0 | 0 |
| 0 | -1 | 1 | 2 | -1 | 0 | -1 | -1 | 1 | 0 |
| 0 | 1 | 1 | 2 | -1 | -1 | 1 | 0 | 0 | 1 |
| 1 | -1 | 0 | 38 | 108 | 41 | 2 | 1 | 0 | 1 |
| 0 | -1 | 1 | 142 | 262 | 148 | 2 | -1 | 1 | 0 |
| 0 | 1 | 1 | 52 | 110 | 55 | -1 | -1 | 1 | 0 |
| 0 | -1 | 2 | 1 | 3 | -1 | 1 | 1 | 0 | 0 |
| 0 | -1 | 1 | 2 | -1 | 0 | -1 | -1 | 1 | 0 |

FIG. 7B

TOUCH SIGNAL DETECTION CIRCUIT AND METHOD, AND TOUCH DEVICE

CROSS-REFERENCE TO RELATED APPLICATIONS

This application is a continuation of International Patent Application No. PCT/CN2014/071118, filed on Jan. 22, 2014, which claims priority to Chinese Patent Application No. 201310022720.3, filed on Jan. 22, 2013, both of which are hereby incorporated by reference in their entireties.

TECHNICAL FIELD

Embodiments of the present invention relate to communications technologies, and in particular, to a touch signal detection circuit and method, and a touch device.

BACKGROUND

In recent years, a touch control device has become one of the most important input devices, and the touch device may convert a user's touch signal into an electrical signal by using a touch detection circuit. A mutual capacitance induction technology is a typical touch detection method. A touch device that uses the mutual capacitance induction technology includes several transmitting electrodes and several receiving electrodes, and the transmitting electrodes and the receiving electrodes are located on different layers. A node formed between each transmitting electrode and each receiving electrode may be equivalent to one node mutual capacitance. When a user touches the touch device, a change in a node capacitance occurs at a touch point. Therefore, a location of the touch point on the touch device can be determined by detecting change values of all node capacitances in the touch device.

Currently, the touch device is extensively used in a user equipment that has a display function, such as a mobile phone and a tablet computer. When a liquid crystal display (Liquid Crystal Display, LCD for short) performs displaying a generated electromagnetic signal may cause interference to touch detection of the touch device, which leads to a decrease in detection precision, and even erroneous detection or a detection failure when the touch device performs detection on a touch location.

SUMMARY

The present invention provides a touch signal detection circuit and method, and a touch device, so as to enhance a capability of the touch device to resist interference from a display device, and improve precision of touch location detection.

A first aspect of the present invention provides a touch signal detection circuit, and the touch signal detection circuit includes a processing unit, at least one linear transmitting electrode, and at least two linear receiving electrodes, where:

the transmitting electrode is perpendicular to the receiving electrode, the receiving electrode is perpendicular to a source driver line of a display screen, and each receiving electrode and each transmitting electrode form one node mutual capacitance; and the processing unit acquires capacitance change values of at least two node mutual capacitances, and acquires a location of a touch signal according to the capacitance change values of the at least two node mutual capacitances.

In a first possible implementation manner of the first aspect, the processing unit is specifically configured to collect statistics on the capacitance change values of the at least two node mutual capacitances, determine an interference value according to a statistical result, and determine the location of the touch signal according to the interference value and the capacitance change values.

According to the first possible implementation manner of the first aspect, in a second possible implementation manner of the first aspect, the processing unit is specifically configured to divide the capacitance change values into two groups according to a numerical range of the capacitance change values, use an average value of or one of all capacitance change values in one group that includes a larger number of capacitance change values as the interference value, obtain a data value by subtracting the interference value from each of the capacitance change values, and take a location, at which the data value is greater than a preset value, of a node mutual capacitance as the location of the touch signal.

A second aspect of the present invention provides a touch device, and the touch device includes a display screen and the touch signal detection circuit according to any one of the first aspect and the first or second possible implementation manner of the first aspect.

A third aspect of the present invention provides a touch signal detection method, and the touch signal detection method includes:

acquiring capacitance change values of at least two node mutual capacitances, where the at least two node capacitances are formed by at least two linear receiving electrodes and at least one linear transmitting electrode, the transmitting electrode is perpendicular to the receiving electrode, the receiving electrode is perpendicular to a source driver line of a display screen, and each receiving electrode and each transmitting electrode form one node mutual capacitance; and acquiring a location of a touch signal according to the capacitance change values of the at least two node mutual capacitances.

In a first possible implementation manner of the third aspect, the acquiring a location of a touch signal according to the capacitance change values of the at least two node mutual capacitances includes:

determining an interference value according to the capacitance change values of the at least two node mutual capacitances; and determining the location of the touch signal according to the interference value and the capacitance change values.

According to the first possible implementation manner of the third aspect, in a second implementation manner of the third aspect, the determining an interference value according to the capacitance change values of the at least two node mutual capacitances includes:

dividing the capacitance change values into two groups according to a numerical range of the capacitance change values, and using an average value of or one of all capacitance change values in one group that includes a larger number of capacitance change values as the interference value; and the determining the location of the touch signal according to the interference value and the capacitance change values includes: obtaining a data value by subtracting the interference value from each of the capacitance change values, and using a location, at which the data value is greater than a preset value, of a node mutual capacitance as the location of the touch signal.

The present invention provides a touch signal detection circuit and method, and a touch device. By means of design, a transmitting electrode and a receiving electrode of the touch signal detection circuit are perpendicular to each other, the receiving electrode is perpendicular to a source driver line of a display screen, and then a location of a touch signal is acquired according to capacitance change values, acquired by a processing unit, of at least two node mutual capacitances. This can reduce interference in touch signal detection caused by display screen driving, thereby improving precision of touch location detection.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 2 is a schematic structural diagram of Embodiment 1 of a touch signal detection circuit according to the present invention;

FIG. 3 is a flowchart of Embodiment 1 of a touch signal detection method according to the present invention;

FIG. 7A and FIG. 7B are schematic diagrams of capacitance change values in Embodiment 5 of a touch signal detection method according to the present invention.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1A:
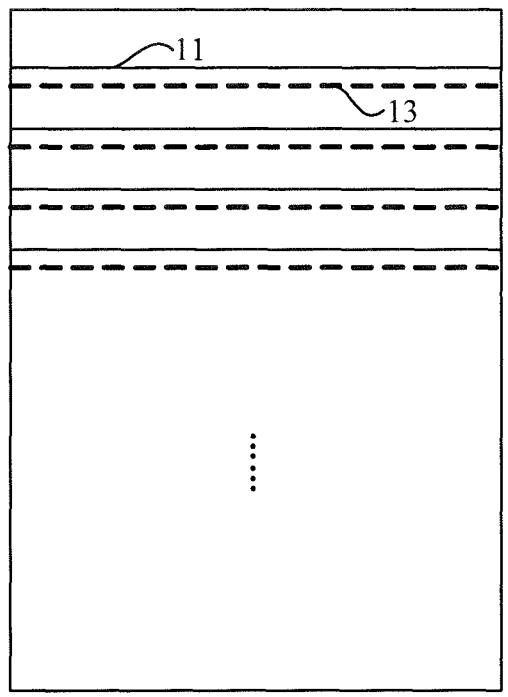
FIG. 1A and FIG. 1B are schematic diagrams of electrode arrangements in Embodiment 1 of a touch signal detection circuit according to the present invention.
Figure 1B:
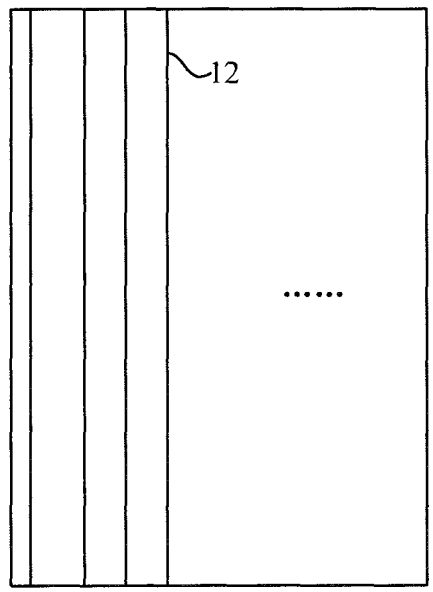

FIG. 1A and FIG. 1B are schematic diagrams of electrode arrangements in Embodiment 1 of a touch signal detection circuit according to the present invention. As shown in FIG. 1A and FIG. 1B, the electrode arrangements in the touch signal detection circuit in this embodiment includes at least one linear transmitting electrode 11 and at least two linear receiving electrodes 12. The transmitting electrode 11 and the receiving electrode 12 are in a perpendicular relationship, and the receiving electrode 12 is perpendicular to a source driver line 13 of a display screen. FIG. 2 is a schematic structural diagram of Embodiment 1 of a touch signal detection circuit according to the present invention. As shown in FIG. 2, the touch signal detection circuit in this embodiment may include a processing unit (not shown), at least one transmitting electrode 11, and at least two receiving electrodes 12. The transmitting electrode 11 and the receiving electrode 12 may be located on two different layers, and each receiving electrode 12 and each transmitting electrode 11 form one node mutual capacitance 14; and the processing unit may acquire capacitance change values of at least two node mutual capacitances 14 and acquire a location of a touch signal according to the capacitance change values of the at least two node mutual capacitances 14.

Specifically, in the touch signal detection circuit in this embodiment, because the transmitting electrode 11 and the receiving electrode 12 are in the perpendicular relationship and the receiving electrode 12 is perpendicular to the source driver line 13 of the display screen, the source driver line 13 of the display screen may cause interference to all the receiving electrodes 12 when driving is performed. When the receiving electrode 12 receives a signal transmitted by the transmitting electrode 11, the receiving electrode 12 receives a transmitted signal component and also receives an interfering signal component generated at the time of display screen driving. Therefore, it may be deemed that the signal received by the receiving electrode 12 includes the transmitted signal component and the interfering signal component generated at the time of the display screen driving. However, because an interfering signal generated at the time of the display screen driving to the receiving electrode 12 is almost not affected by a finger touch, interfering signals generated at the time of the display screen driving are close for all receiving electrodes 12 corresponding to a same transmitting electrode 11, and do not change along with a touch status. For one transmitting electrode 11, a similar interfering signal component generated at the time of the display screen driving is found on each receiving electrode; then each receiving electrode subtracts the interfering signal component, and a transmitted signal component transmitted by the transmitting electrode may be obtained. This can reduce interference in the touch signal detection circuit caused by the display screen driving, thereby improving detection precision of the touch signal detection circuit.

It may be understood that the transmitting electrode and the receiving electrode are not limited to forms shown in FIG. 2, and an arrangement of the touch signal detection circuit may also be an electrode arrangement in a single-layer and multi-node manner. The forms of the transmitting electrode and the receiving electrode are not limited to a continuous electrode that is connected entirely, and may be a discontinuous rectangular electrode block or rhombic electrode block. A capacitive screen module is led out of the screen from these electrode blocks by using conducting wires, and then these conducting wires are connected to each other, which can implement a connection among these electrode blocks so as to form a transmitting electrode or a receiving electrode.

The foregoing source driver line 13 of the display screen may be a source driver line in an LCD display. When the display screen displays, the source driver line charges a display point, and therefore a direction of an interfering signal generated when the display screen displays is consistent with a direction of the source driver line. In this embodiment, the receiving electrode 12 is perpendicular to the source driver line 13 of the display screen, which can ensure that interfering signals generated at the time of the display screen driving and received by at least two receiving electrodes are similar. A similar interfering signal component generated at the time of the display screen driving is found on each receiving electrode, and then each receiving electrode subtracts the interfering signal component. In this way, interference caused by the display screen driving can be reduced.

The signal received by the receiving electrode 12 may be represented by using the capacitance change values, acquired by the processing unit, of the at least two node mutual capacitances 14. The interfering signal component generated at the time of the display screen driving may be determined according to the capacitance change values of the at least two node mutual capacitances 14, and then the location of the touch signal is acquired according to the capacitance change values of the at least two node mutual capacitances 14 after the interference from the display screen driving is eliminated. This can reduce the interference in touch signal detection caused by the display screen driving, thereby improving precision of touch location detection.

It should be noted that technical solutions in this embodiment of the present invention are not limited to reduction of the interference caused by the display screen driving, but are also applicable to reduction of interference that affects overall data characteristics of the touch signal detection circuit, such as interference of a temperature change and a humidity change that causes overall offset to the touch signal detection circuit in signal detection, or interference of a radio frequency (Radio Frequency, RF for short) and the like that affect all receiving electrodes corresponding to a same transmitting electrode simultaneously.

According to a touch signal detection circuit provided in this embodiment, by means of design, a transmitting electrode and a receiving electrode in the touch signal detection circuit are perpendicular to each other, the receiving electrode is perpendicular to a source driver line of a display screen, and then a location of a touch signal is acquired according to capacitance change values, acquired by a processing unit, of at least two node mutual capacitances. This can reduce interference in touch signal detection caused by display screen driving, thereby improving precision of touch location detection.

Further, based on Embodiment 1 of the touch signal detection circuit provided in the present invention, the processing unit may specifically be configured to collect statistics on the capacitance change values of the at least two node mutual capacitances, determine an interference value according to a statistical result, and determine the location of the touch signal according to the interference value and the capacitance change values.

Specifically, the processing unit collects statistics on the acquired capacitance change values of the at least two node mutual capacitances, determines the interference value according to the statistical result, may obtain a clean touch signal by subtracting the determined interference value from the acquired capacitance change values of the node mutual capacitances and may precisely determine the location of the touch signal according to the clean touch signal. This can avoid a decrease in detection precision, and even erroneous detection or a detection failure caused by an interfering signal when the touch signal detection circuit performs detection on a touch location. Therefore, precision of touch location detection is improved.

According to a touch signal detection circuit provided in this embodiment, a processing unit collects statistics on capacitance change values of at least two node mutual capacitances, determines an interference value according to a statistical result and determines a location of a touch signal according to the interference value and the capacitance change values. This can reduce interference in touch signal detection caused by display screen driving, thereby improving precision of touch location detection.

Furthermore, based on Embodiment 1 of the touch signal detection circuit provided in the present invention, the processing unit may specifically be configured to divide the capacitance change values into two groups according to a numerical range of the capacitance change values, use an average value of or one of all capacitance change values in one group that includes a larger number of capacitance change values as the interference value, obtain a data value by subtracting the interference value from the capacitance change values, and take a location, at which the data value is greater than a preset value, of a node mutual capacitance as the location of the touch signal.

Specifically, compared with the entire touch signal detection circuit, a touch action generates a touch signal only in a relatively small area, and the touch signal detection circuit may be divided into a touch area and a non-touch area. There is a relatively large difference between capacitance change values in the touch area and capacitance change values in the non-touch area. Therefore, the capacitance change values may be divided into two groups according to the numerical range of the capacitance change values. The group that includes the larger number of capacitance change values may be considered to be in the non-touch area, and the capacitance change values in this group are generated mainly due to impact exerted by the interfering signal on the receiving electrode. The average value of or one of all the capacitance change values in the group that includes the larger number of capacitance change values is used as the interference value. The data value is obtained by subtracting the interference value from the capacitance change values, where it may be considered that the data value is generated due to impact exerted by the clean touch signal on the receiving electrode. Then, the location, at which the data value is greater than the preset value, of the node mutual capacitance is taken as the location of the touch signal.

It may be understood that the foregoing interference value is not limited to the average value of or one of all the capacitance change values in the group that includes the larger number of capacitance change values. Statistics may further be collected on the acquired capacitance change values by using related methods so as to determine the interference value.

According to a touch signal detection circuit provided in this embodiment, a processing unit divides capacitance change values into two groups according to a numerical range of the capacitance change values, uses an average value of or one of all capacitance change values in one group that includes a larger number of capacitance change values as an interference value, obtains a data value by subtracting the interference value from the capacitance change values and takes a location, at which the data value is greater than a preset value, of a node mutual capacitance as a location of a touch signal. This can reduce interference in touch signal detection caused by display screen driving, thereby improving precision of touch location detection.

An embodiment of the present invention further provides a touch device, and the touch device may include a display screen and the touch signal detection circuit in any one of the foregoing embodiments.

The touch device in this embodiment of the present invention includes but is not limited to a mobile phone that has a touch signal detection circuit, personal digital assistant (Personal Digital Assistant, PDA for short), a wireless handheld device, a wireless netbook, a portable computer, an MP3 player, an MP4 player, and the like that have a touch signal detection circuit.

A touch device provided in an embodiment includes a display screen and the touch signal detection circuit in any one of the foregoing embodiments. In the touch signal detection circuit in the touch device, a transmitting electrode is perpendicular to a receiving electrode, and the receiving electrode is perpendicular to a source driver line of the display screen. This can reduce interference in touch signal detection caused by display screen driving, thereby improving precision of touch location detection.

FIG. 3 is a flowchart of Embodiment 1 of a touch signal detection method according to the present invention. As shown in FIG. 3, the touch signal detection method in this embodiment includes:

S301. Acquire capacitance change values of at least two node mutual capacitances, where the at least two node capacitances are formed by at least two linear receiving electrodes and at least one linear transmitting electrode, the transmitting electrode is perpendicular to the receiving electrode, the receiving electrode is perpendicular to a source driver line of a display screen, and each receiving electrode and each transmitting electrode form one node mutual capacitance.

Specifically, the foregoing at least two node mutual capacitances are formed by the at least two linear receiving electrodes and the at least one linear transmitting electrode. The transmitting electrode is perpendicular to the receiving electrode, and the receiving electrode is perpendicular to the source driver line of the display screen, which may make an interfering signal generated when the source driver line of the display screen performs display driving cause interference to all the receiving electrodes. When the receiving electrode receives a signal transmitted by the transmitting electrode, the receiving electrode receives a transmitted signal component and also receives an interfering signal component generated at the time of display screen driving. Therefore, it may be deemed that the signal in the receiving electrode consists of the transmitted signal component and the interfering signal component generated at the time of the display screen driving. However, because the interfering signal component generated at the time of the display screen driving to the receiving electrode is almost not affected by a finger touch, interfering signals generated at the time of the display screen driving are similar for all receiving electrodes corresponding to a same transmitting electrode and do not change along with different touch statuses.

S302. Acquire a location of a touch signal according to the capacitance change values of the at least two node mutual capacitances.

Specifically, the signal received by the receiving electrode may be represented by using the capacitance change values, acquired by a processing unit, of the at least two node mutual capacitances. The interfering signal component generated at the time of the display screen driving may be determined according to the capacitance change values of the at least two node mutual capacitances, and then the location of the touch signal is acquired according to the capacitance change values of the at least two node mutual capacitances after the interference from the display screen driving is eliminated. This can reduce the interference in touch signal detection caused by the display screen driving, thereby improving precision of touch location detection.

This embodiment may be executed by a processing unit disposed in a touch signal detection circuit, or a processor of a touch device that includes a touch signal detection circuit.

It should be noted that technical solutions in this embodiment of the present invention are not limited to elimination of the interference caused by the display screen driving, but are also applicable to elimination of interference that affects overall data characteristics of the touch signal detection circuit, such as interference of a temperature change and a humidity change that causes overall offset to the touch signal detection circuit in signal detection, or interference of a radio frequency, RF for short, and the like that affect all receiving electrodes corresponding to a same transmitting electrode simultaneously.

According to a touch signal detection method provided in this embodiment, a processing unit acquires capacitance change values of at least two node mutual capacitances, where the at least two node capacitances are formed by at least two linear receiving electrodes and at least one linear transmitting electrode, the transmitting electrode is perpendicular to the receiving electrode, the receiving electrode is perpendicular to a source driver line of a display screen, and each receiving electrode and each transmitting electrode form one node mutual capacitance; and then a location of a touch signal is acquired according to the capacitance change values of the at least two node mutual capacitances. This can reduce interference in touch signal detection caused by display screen driving, thereby improving precision of touch location detection.

Figure 4:
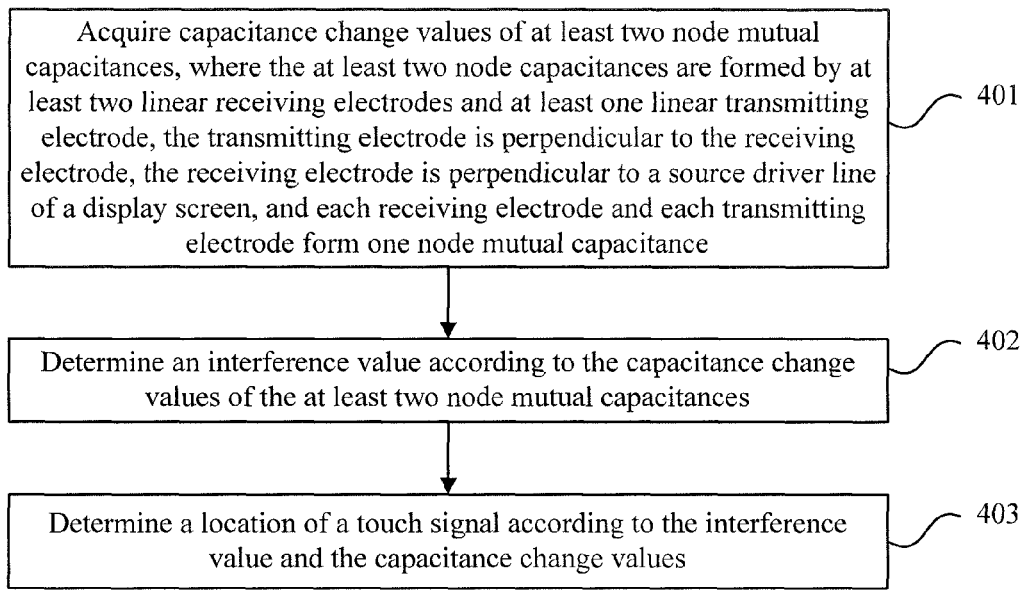
FIG. 4 is a flowchart of Embodiment 2 of a touch signal detection method according to the present invention.

FIG. 4 is a flowchart of Embodiment 2 of a touch signal detection method according to the present invention, and the touch signal detection method in this embodiment includes:

S401. Acquire capacitance change values of at least two node mutual capacitances, where the at least two node capacitances are formed by at least two linear receiving electrodes and at least one linear transmitting electrode, the transmitting electrode is perpendicular to the receiving electrode, the receiving electrode is perpendicular to a source driver line of a display screen, and each receiving electrode and each transmitting electrode form one node mutual capacitance.

S402. Determine an interference value according to the capacitance change values of the at least two node mutual capacitances.

A method for determining the interference value may be to collect statistics on or calculate the capacitance change values, acquired by a processing unit, of the node mutual capacitances, and may also be implemented by using a specific simulation algorithm.

S403. Determine a location of a touch signal according to the interference value and the capacitance change values.

For example, a data value may be obtained by subtracting the interference value from the capacitance change values, where the data value may represent a clean touch signal, and then touch detecting and locating are performed according to the data value.

This embodiment may be executed by a processing unit disposed in a touch signal detection circuit, or a processor of a touch device that includes a touch signal detection circuit.

Figure 5A:
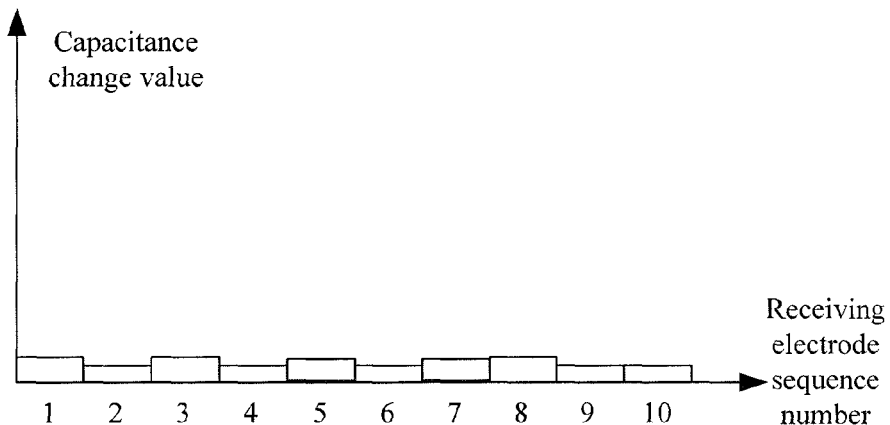
FIG. 5A to FIG. 5D are schematic diagrams of capacitance change values in Embodiment 3 of a touch signal detection method according to the present invention.
Figure 5B:
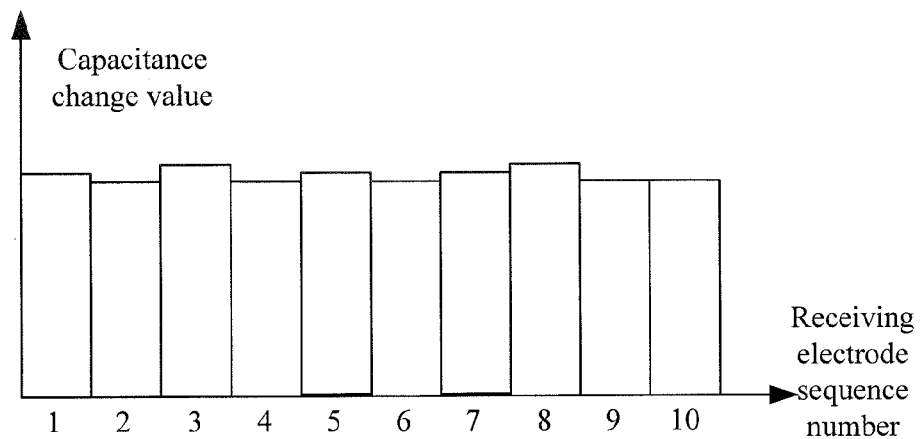
Figure 5C:
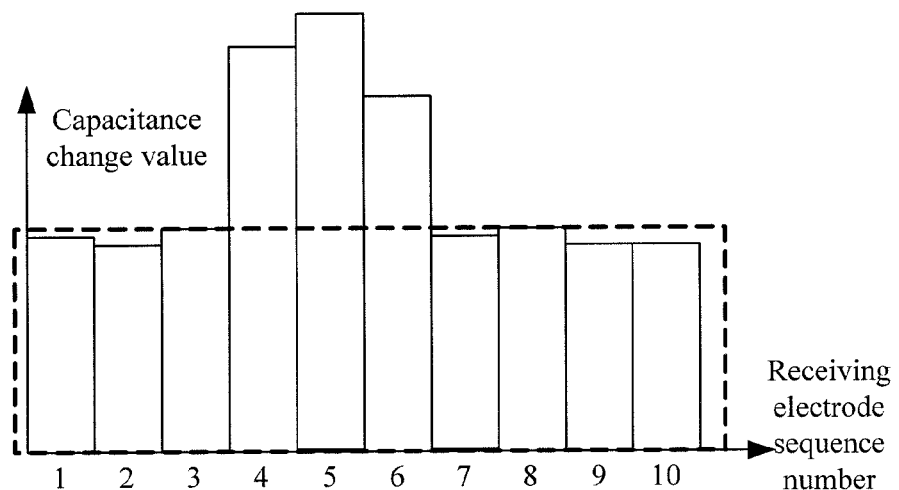
Figure 5D:
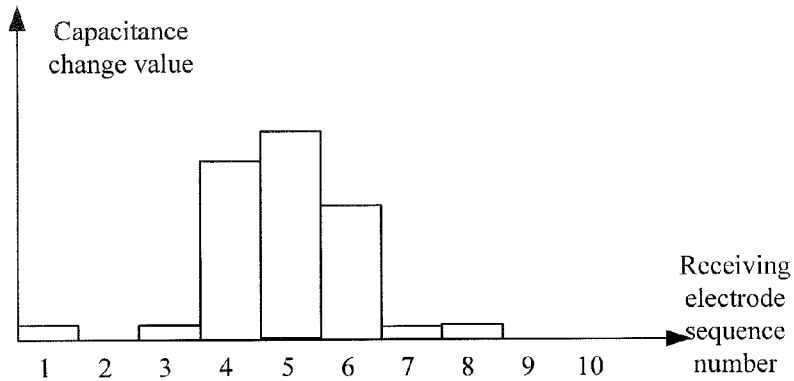

FIG. 5A to FIG. 5D are schematic diagrams of capacitance change values in Embodiment 3 of a touch signal detection method according to the present invention. The following describes in detail the touch signal detection method in this embodiment with reference to FIG. 5A to FIG. 5D. As shown in FIG. 5A to FIG. 5D, 10 node capacitances formed by 1 transmitting electrode and 10 receiving electrodes are used as an example. FIG. 5A is a schematic diagram of capacitance change values detected by a processing unit when there is no interference caused by display screen driving and no touch. When there is no interference caused by the display screen driving and no touch, change values, detected by the processing unit, of the 10 node capacitances are relatively small. These relatively small change values are caused by system noise. FIG. 5B is a schematic diagram of capacitance change values detected by the processing unit when there is interference caused by display screen driving but no touch. When there is interference caused by the display screen driving but no touch, relatively large capacitance change values may be detected. For the same transmitting electrode, signals received by these receiving electrodes are similar in amplitude, and these interfering signals similar in amplitude can be referred to as interference values of the signals. FIG. 5C is a schematic diagram of capacitance change values detected by the processing unit when there are interference caused by display screen driving and a touch. When there is a touch, a touch signal and an interfering signal caused by the display screen driving are superimposed, and a similar interfering signal caused by the display screen driving may be obtained by means of comparison. A dashed part in FIG. 5C is interference values. FIG. 5D is a schematic diagram of capacitance change values after interference caused by the display screen driving is eliminated. Because the interference caused by the display screen driving is similar, after a similar signal is eliminated, capacitance change values corresponding to a clean touch signal may be obtained. Specifically, the capacitance variation values corresponding to the clean touch signal may be obtained by subtracting the interference value from the capacitance change values acquired by the processing unit, and then touch detecting and locating are performed according to the capacitance change values corresponding to the clean touch signal.

According to a touch signal detection method provided in this embodiment, a processing unit acquires capacitance change values of at least two node mutual capacitances, where the at least two node capacitances are formed by at least two linear receiving electrodes and at least one linear transmitting electrode, the transmitting electrode is perpendicular to the receiving electrode, the receiving electrode is perpendicular to a source driver line of a display screen, and each receiving electrode and each transmitting electrode form one node mutual capacitance; an interference value is determined according to the capacitance change values of the at least two node mutual capacitances; and then a location of a touch signal is determined according to the interference value and the capacitance change values. This can reduce interference in touch signal detection caused by display screen driving, thereby improving precision of touch location detection.

Figure 6:
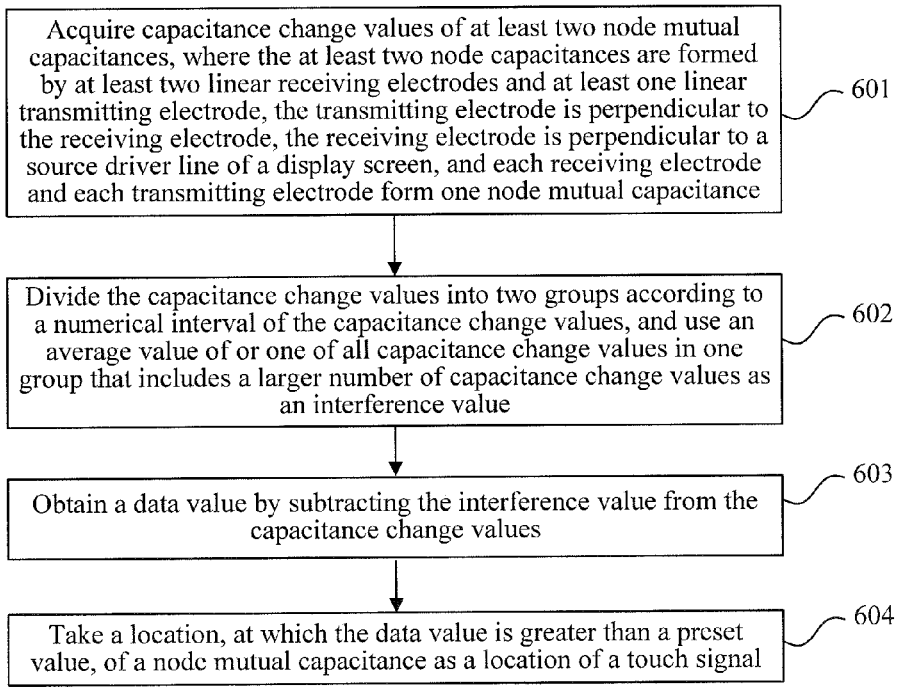
FIG. 6 is a flowchart of Embodiment 4 of a touch signal detection method according to the present invention.

FIG. 6 is a flowchart of Embodiment 4 of a touch signal detection method according to the present invention, and the touch signal detection method in this embodiment includes:

S601. Acquire capacitance change values of at least two node mutual capacitances, where the at least two node capacitances are formed by at least two linear receiving electrodes and at least one linear transmitting electrode, the transmitting electrode is perpendicular to the receiving electrode, the receiving electrode is perpendicular to a source driver line of a display screen, and each receiving electrode and each transmitting electrode form one node mutual capacitance.

S602. Divide the capacitance change values into two groups according to a numerical range of the capacitance change values, and use an average value of or one of all capacitance change values in one group that includes a larger number of capacitance change values as an interference value.

S603. Obtain a data value by subtracting the interference value from the capacitance change values.

S604. Take a location, at which the data value is greater than a preset value, of a node mutual capacitance as a location of a touch signal.

This embodiment may be executed by a processing unit disposed in a touch signal detection circuit, or a processor of a touch device that includes a touch signal detection circuit.

FIG. 7A and FIG. 7B are schematic diagrams of capacitance change values in Embodiment 5 of a touch signal detection method according to the present invention. The following describes in detail the touch signal detection method in this embodiment with reference to FIG. 7A and FIG. 7B. As shown in FIG. 7A and FIG. 7B, 120 node capacitances formed by 12 transmitting electrodes and 10 receiving electrodes are used as an example. FIG. 7A is another schematic diagram of capacitance change values detected by a processing unit when there is interference caused by display screen driving and a touch. A black circle in FIG. 7A indicates a touch location. For example, when a processing unit in a touch signal detection circuit performs touch detecting and locating, it is set that when a capacitance change value is greater than 100, a touch action is deemed to occur. However, existence of interference caused by the display screen driving leads to fluctuation in many capacitance change values, so that capacitance change values detected in some areas in which no touch action occurs exceed 100, such as capacitance change values in shadow areas in FIG. 7A. As a result, erroneous detection is inevitable.

According to a numerical range of 10 capacitance change values that are generated by a same transmitting electrode and received by the 10 receiving electrodes in FIG. 7A, an interference value of the 10 capacitance change values that are generated by the same transmitting electrode and received by the 10 receiving electrodes may be determined. A specific determining method is to divide the capacitance change values into two groups according to the numerical range of the capacitance change values, and use an average value of or one of all capacitance change values in one group that includes a larger number of capacitance change values as the interference value. For example, because the 10 capacitance change values on the second row in FIG. 7A are relatively close, the interference value 120 is one of the 10 capacitance change values. On the eighth row in FIG. 7A, "198, 268, 201" may be included in a first group, the other seven close capacitance change values are included in a second group, and the interference value 120 is a capacitance change value in the second group.

FIG. 7B is another schematic diagram of capacitance change values after interference caused by display screen driving is eliminated. A data value is obtained after an interference value is subtracted from each capacitance change value in FIG. 7B. In FIG. 7B, a location, at which a capacitance change value is greater than a preset value 100, of a node mutual capacitance is taken as a location of a touch signal.

According to a touch signal detection method provided in this embodiment, a processing unit acquires capacitance change values of at least two node mutual capacitances, where the at least two node capacitances are formed by at least two linear receiving electrodes and at least one linear transmitting electrode, the transmitting electrode is perpendicular to the receiving electrode, the receiving electrode is perpendicular to a source driver line of a display screen, and each receiving electrode and each transmitting electrode form one node mutual capacitance; an interference value is determined according to the capacitance change values of the at least two node mutual capacitances; the capacitance change values are divided into two groups according to a numerical range of the capacitance change values; an average value of or one of all capacitance change values in one group that includes a larger number of capacitance change values is used as the interference value; a data value is obtained by subtracting the interference value from the capacitance change values; and a location, at which the data value is greater than a preset value, of a node mutual capacitance is taken as a location of a touch signal. This can reduce interference in touch signal detection caused by display screen driving, thereby improving precision of touch location detection.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A touch signal detection circuit, comprising:
   a processor,
   at least one linear transmitting electrode, and
   at least two linear receiving electrodes;
   wherein the at least one linear transmitting electrode is perpendicular to the at least two linear receiving electrodes, the at least two linear receiving electrodes are perpendicular to a source driver line of a display screen, and each receiving electrode and each transmitting electrode form one node mutual capacitance; and
   wherein the processor is configured to:
      acquire capacitance change values of at least two node mutual capacitances,
      divide the capacitance change values into two groups according to a numerical range of the capacitance change values,
      use one of the capacitive change values or an average value of the capacitance change values in one group that comprises a larger number of capacitance change values as an interference value,
      obtain a data value by subtracting the interference value from each of the capacitance change values, and
      use a location, at which the data value is greater than a preset value, of a node mutual capacitance as a location of a touch signal.

2. The touch signal detection circuit according to claim 1, wherein the display screen comprises a liquid crystal display (LCD).

3. A touch device, comprising:
   a display screen; and
   a touch signal detection circuit that includes a processing unit, at least one linear transmitting electrode, and at least two linear receiving electrodes,
   wherein the at least one linear transmitting electrode is perpendicular to the at least two linear receiving electrodes, the at least two linear receiving electrodes are perpendicular to a source driver line of the display screen, and each receiving electrode and each transmitting electrode form one node mutual capacitance; and
   wherein the processing unit is configured to:
      acquire capacitance change values of at least two node mutual capacitances,
      divide the capacitance change values into two groups according to a numerical range of the capacitance change values,
      use one of the capacitive change values or an average value of the capacitance change values in one group that comprises a larger number of capacitance change values as an interference value,
      obtain a data value by subtracting the interference value from each of the capacitance change values, and
      use a location, at which the data value is greater than a preset value, of a node mutual capacitance as a location of a touch signal.

4. The touch device according to claim 3, wherein the display screen comprises a liquid crystal display (LCD).

5. A touch signal detection method, comprising:
   acquiring capacitance change values of at least two node mutual capacitances, wherein the at least two node mutual capacitances are formed by at least two linear receiving electrodes and at least one linear transmitting electrode, the at least one linear transmitting electrode is perpendicular to the at least two linear receiving electrodes, the at least two linear receiving electrodes are perpendicular to a source driver line of a display screen, and each receiving electrode and each transmitting electrode form one node mutual capacitance;
   acquiring a location of a touch signal according to the capacitance change values of the at least two node mutual capacitances, wherein acquiring the location of the touch signal comprises:
      determining an interference value according to the capacitance change values of the at least two node mutual capacitances; and
      determining the location of the touch signal according to the interference value and the capacitance change values,
   wherein determining the interference value comprises:
      dividing the capacitance change values into two groups according to a numerical range of the capacitance change values, and using one of the capacitive change values or an average value of the capacitance change values in one group that comprises a larger number of capacitance change values as the interference value; and
   wherein determining the location of the touch signal comprises: obtaining a data value by subtracting the interference value from each of the capacitance change values; and, using a location, at which the data value is greater than a preset value, of a node mutual capacitance as the location of the touch signal.

6. The touch signal detection method according to claim 5, wherein the display screen comprises a liquid crystal display (LCD).

* * * * *